(12) United States Patent
Mittal et al.

(10) Patent No.: US 7,996,598 B2
(45) Date of Patent: Aug. 9, 2011

(54) MEMORY MANAGEMENT MODULE

(75) Inventors: Alok Kumar Mittal, Delhi (IN); Chander Bhushan Goel, Noida (IN); Hubert Rousseau, Marseilles (FR)

(73) Assignees: STMicroelectronics Pvt. Ltd., Uttar Pradesh (IN); STMicroelectronics S.A., Montrouge (FR)

( * ) Notice: Subject to any disclaimer, the term of this patent is extended or adjusted under 35 U.S.C. 154(b) by 579 days.

(21) Appl. No.: 11/725,186

(22) Filed: Mar. 14, 2007

(65) Prior Publication Data

US 2008/0059691 A1    Mar. 6, 2008

(30) Foreign Application Priority Data

Mar. 14, 2006  (IN) .............. 688/DEL/2006

(51) Int. Cl.
*G06F 12/00* (2006.01)
(52) U.S. Cl. ........ 711/103; 711/104; 711/133; 711/165; 711/206
(58) Field of Classification Search .......... 711/165, 711/104, 103, 133, 206
See application file for complete search history.

(56) References Cited

U.S. PATENT DOCUMENTS

| | | | |
|---|---|---|---|
| 5,313,611 A * | 5/1994 | Franklin et al. | 711/206 |
| 5,907,856 A * | 5/1999 | Estakhri et al. | 711/103 |
| 6,438,643 B1 * | 8/2002 | Ohara et al. | 711/103 |
| 6,578,123 B1 * | 6/2003 | Austin et al. | 711/165 |
| 6,661,706 B2 | 12/2003 | Kawai et al. | |
| 6,760,805 B2 | 7/2004 | Lasser et al. | |
| 6,868,007 B2 | 3/2005 | Hasegawa et al. | |
| 6,970,969 B2 | 11/2005 | Wong et al. | |
| 6,978,342 B1 | 12/2005 | Estakhri et al. | |
| 7,155,560 B2 * | 12/2006 | McGrew et al. | 711/103 |
| 7,281,104 B1 * | 10/2007 | Tsypliaev et al. | 711/165 |
| 2004/0193786 A1 * | 9/2004 | Inagaki et al. | 711/105 |
| 2004/0221092 A1 * | 11/2004 | Lee | 711/103 |
| 2006/0090032 A1 * | 4/2006 | Franklin et al. | 711/114 |
| 2006/0294304 A1 * | 12/2006 | Brown et al. | 711/115 |
| 2007/0170268 A1 * | 7/2007 | Lee | 235/492 |

* cited by examiner

*Primary Examiner* — Kevin L Ellis
*Assistant Examiner* — Matthew Bradley
(74) *Attorney, Agent, or Firm* — Lisa K. Jorgenson; Andre M. Szuwalski

(57) ABSTRACT

A methodology for efficiently copying data is presented. An internal controller RAM is multiplexed between storing existing RAM data such as look up table data) and storing copy back data with respect to a flash memory. The data in the controller RAM is temporarily stored in a free space of the flash memory. The data of the flash memory, which is to be copied, is read from a source page and is stored in the free space of the controller RAM, and from there, the data is written to a destination block of the flash memory. After completion of the copy back operation, the data of the controller RAM that was moved to the free space is retrieved for storage back in the controller RAM.

5 Claims, 2 Drawing Sheets

MEMORY MANAGEMENT MODULE

PRIORITY CLAIM

The present application claims priority from Indian Patent Application No. 688/Del/2006 filed on Mar. 14, 2006 as a provisional application, and for which a complete application was filed on Mar. 13, 2007, the disclosures of which are hereby incorporated by reference.

BACKGROUND OF THE INVENTION

1. Field of the Invention

The present invention relates to memory devices, and more specifically, to a method for efficiently multiplexing an internal RAM of a controller, and a free-block of non-volatile memory for managing a copy-back operation.

2. Background of the Invention

Most of the flash memories have an internal copy-back command available. However, some memories do not have this in-built feature, and require a usage of an external RAM of the flash memory controller. Thus the copy-operation can only be carried out by using the external controller's RAM. The copy-back is managed by reading data from a source, page by page, and then writing it to a destination in the same way. A large amount of RAM is required for temporarily storing the data between these read and write operations.

The existing techniques use a small part of RAM (almost 512 Bytes) for performing multiple read-write operations with multiple programming commands. This takes a longer time for the copy operation of several pages because the programming times, usually, are greater than a read and write time. Moreover, the area of the Look-Up Table (LUT) in the RAM is not utilized, and thus remains un-changed.

Another method to overcome this problem is to invalidate the LUT, while utilizing the LUT RAM area after copy-operation and later build the LUT again. However, this process is time consuming, as all blocks need to be read again and then a logical to physical mapping is re-built.

U.S. Pat. No. 6,760,805 discloses a flash management system for a large page size. The patent describes the usage of the 2K/Large Page size NAND for enabling flash memory systems to support flash devices with pages that are larger than operating system data sector sizes, while not describing the copy algorithm itself.

U.S. Pat. No. 6,978,342 discloses a technique to identify a source and destination location, when a decision is taken to copy a data from an "original location" to a "moved location". Therefore, this method does not address the copy algorithm itself but only identifies the source and destination blocks.

U.S. Pat. No. 6,970,969 provides a multiple segment data structure and a method to manage data objects stored in multiple segments. However, this method does not address the algorithm technique for a copy operation.

U.S. Pat. No. 6,868,007 provides a controller system with a first decoder which decodes an address for a page copy destination and a data input command and controls the operations of a row decoder and a control circuit, a sense amplifier, and a page buffer. A second decoder decodes an address for an ordinary program and a data input command and controls the operations of the row decoder and control circuit. It also provides for a data copying method by inputting a management data for page data to a redundant area of a nonvolatile memory, executing a program, and when moving the page data in the nonvolatile memory to one other page, reading the page data during a program period for the one other page to check the page data for errors. Therefore, this method provides for a memory controller system with inbuilt decoders. However, it does not provide for a copy operation by sharing the look-up RAM memory.

U.S. Pat. No. 6,661,706 discloses an inbuilt facility, inside the memory itself, to manage a copy-operation within itself once the source and destination addresses are provided.

The prior art discussed above does not overcome all the shortcomings encountered in the field of copy back operation in the flash memories. Problems like a large processing time, failure to address a copy algorithm itself, failure to provide for a copy operation by sharing a look-up RAM memory, etc., still persist.

Therefore, there arises a need to provide an efficient copy operation in the flash memories. There is a need to provide a method for efficiently copying of data with utilizing a large size additional RAM There is a need to provide a method for efficiently copying of data with high throughput rates. There is a need to provide a method for efficiently copying of data in memories, which do not support internal copy back command.

The proposed method requires a lesser amount of RAM storage, which otherwise can be utilized for other purposes, and at the same time the method performs the task in a lesser amount of time as the transfer rate of copy operation of data from the one block to another is maximized by the method.

SUMMARY OF THE INVENTION

To achieve the aforementioned objectives, a method of providing an efficient read-write operation through a multiplexing technique comprises:

searching for a free sector in a flash memory using a look up table (LUT) stored in a controller RAM;
   writing a specified data from said controller RAM into said free sector of the flash memory;
   checking an availability for a required space in the controller RAM;
   when said required space is not available, writing a next specified data of said controller RAM into the free sector of the flash memory;
   when said required space is available, reading a page from a source sector of the flash memory to store in a freed RAM of the controller;
   writing data of said page from the RAM to a page of a destination sector of the flash memory;
   checking if all required pages are copied;
   when said required pages are not copied, reading a next data page from the source sector of the flash memory to store in said freed RAM of the controller and writing the data of said next page from the RAM to the page of the destination sector of the flash memory;
   when said required pages are copied, reading the specified data from said free sector of the flash memory to said space in the RAM;
   checking retrieving status for all previous RAM data; and
   when the retrieving status is not complete, reading a next specified data from said free sector of the flash memory to a next space in the RAM.

Further, a system for providing an efficient read-write operation through a multiplexing technique comprises:

a memory module having a plurality of sectors for storing data;
   a register module for storing instructions comprising:
   a pointer for searching a free memory sector in said memory;
   a comparator for comparing data values at the plurality of sectors; and a processor receiving said instructions for executing said read write operation on the plurality of sectors.

Further, a computer program product utilizing a method of providing an efficient read-write operation through multiplexing a controller RAM, the computer program product comprises a computer readable medium configured with processor executable instructions, the computer program product comprises:

searching for a free sector in a flash memory using a look up table (LUT) stored in a controller RAM;

writing a specified data from said controller RAM into said free sector of the flash memory;

checking an availability for a required space in the controller RAM;

when said required space is not available, writing a next specified data of said controller RAM into the free sector of the flash memory;

when said required space is available, reading a page from a source sector of the flash memory to store in a freed RAM of the controller;

writing data of said page from the RAM to a page of a destination sector of the flash memory;

checking if all required pages are copied;

when said required pages are not copied, reading a next data page from the source sector of the flash memory to store in said freed RAM of the controller and writing the data of said next page from the RAM to the page of the destination sector of the flash memory;

when said required pages are copied, reading the specified data from said free sector of the flash memory to said space in the RAM;

checking retrieving status for all previous RAM data; and when the retrieving status is not complete, reading a next specified data from said free sector of the flash memory to a next space in the RAM.

DETAILED DESCRIPTION OF THE DRAWINGS

Figure 1:
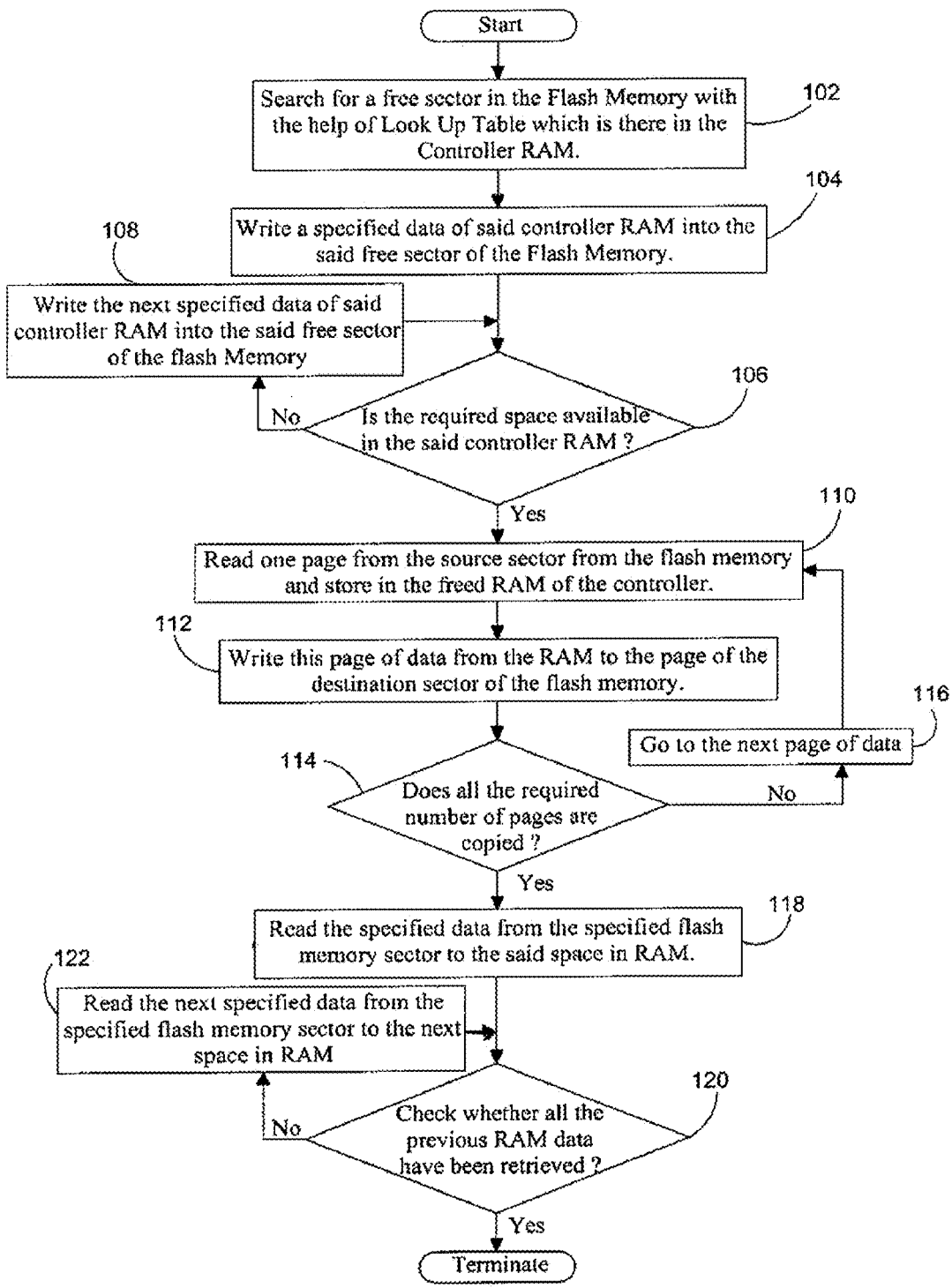
FIG. 1 illustrates a flow chart of a method for providing an efficient read-write operation.

The preferred embodiments will be described in detail with reference to the accompanying drawings. However, the present invention is not limited to the preferred embodiments. The present invention can be modified in various forms. The preferred embodiments are only provided to explain more clearly the present invention to the ordinarily skilled in the art of the present invention. In the accompanying drawings, like reference numerals are used to indicate like components.

A method and system for efficiently copying data without utilizing a large size additional RAM is presented. The additional RAM is used for storing important data, like, the look-up tables, which are used to map a logical address to a physical address.

This method can be used in mass-storage systems, where data has to be copied from one block of a flash memory to the other. For memories, which do not support internal copy back command, this operation has to be done by a direct read-write method.

In this method, a copy back operation is done by multiplexing an internal RAM of a controller between the existing RAM data and copy back flash data, by using a free block on a NAND flash memory itself (which is coupled to said controller RAM). An existing data of said controller RAM is temporarily saved in said free block of the NAND flash memory. After the copy back of the flash data is completed, the existing data of said controller RAM can be retrieved back from the NAND flash memory.

FIG. 1 illustrates a flow chart of the method. At step 102, a search is made to find a free sector in a flash memory with the help of look up tables LUTs stored in a controller RAM. At step 104, a specified data of the controller RAM (such as the stored LUT data) is written into the free sector of the flash memory. In an embodiment the specified data is 2K bytes data. At step 106, a check is made to ascertain whether a sufficient space has been made available in the controller RAM following removal of the specified data. If a sufficient space is not available, a next specified data of the controller RAM is written into the free sector of the flash memory, as depicted in step 108. At step 110, a page of flash data from the source sector of the flash memory is read and is stored in a freed RAM of the controller, if the sufficient space is available. At step 112, flash data of this page from the controller RAM is written to a page of a destination sector of the flash memory. At step 114, a checking is done to ascertain whether all the required pages of flash data have been copied. If all the required pages have not been copied, a next data page of flash data is read from the source sector of the flash memory to store in the freed RAM of the controller and the flash data of the next page from the RAM is written to the page of the destination sector of the flash memory as shown in step 110 and steps 112 through 116. If all the required pages are copied, then the specified data from the free sector of the flash memory is read and stored back in the space in the controller RAM, as shown in 118. At step 120, a check is performed to ascertain whether all the previous specified data have been retrieved. If all the previous specified data has not been retrieved, a next specified data from the free sector of the flash memory is read to a next space in the controller RAM, as shown at step 122, and the process returns to step 120. If all the previous specified data has been retrieved, then the process terminates.

Figure 2:
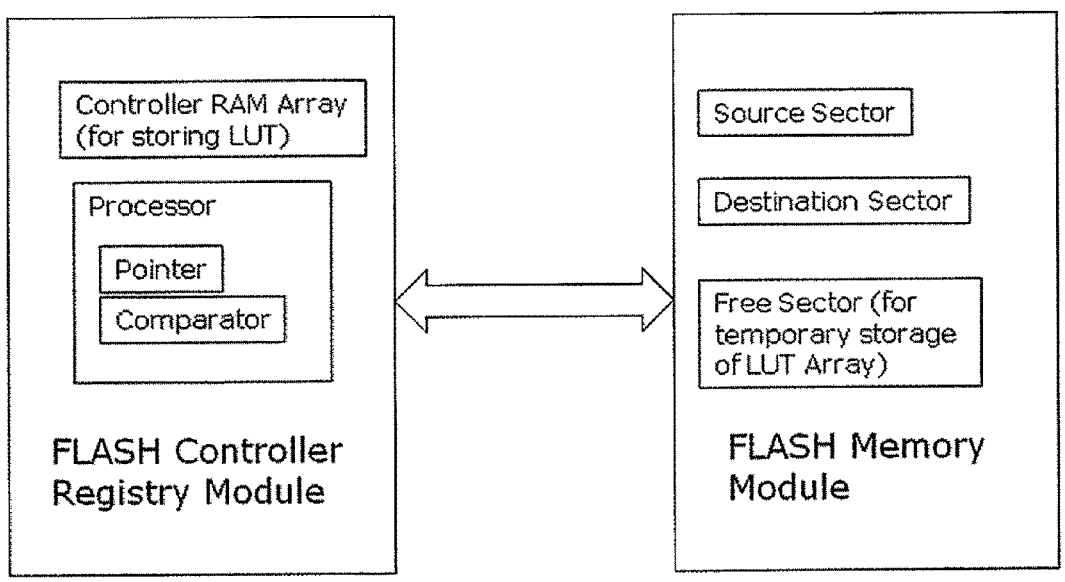
FIG. 2 illustrates a system block diagram.

A system as shown in FIG. 2 includes a NAND flash memory module which has a plurality of sectors for storing data. A controller register module stores instructions, and includes a pointer for searching a free memory sector of the NAND flash memory module and a comparator which compares data values at the plurality of sectors. A processor receives instructions for executing read/write operations on the plurality of sectors. The pointer can be an address pointer and/or a data pointer.

The method and system described offers many advantages. First, this invention requires a lesser amount of RAM, which otherwise can be utilized for other purposes. Second, a less amount of time is required for performing the task as the transfer rate of copy operation of flash data from one block to another of the flash memory is maximized by this method. The data of said controller RAM is temporarily stored in the free block of said flash memory and then retrieved by the controller RAM itself. Thereby, time required to re-build the previous RAM data, like LUT data, which takes a longer time to rebuild, is saved. Third, as this method requires lesser RAM, the total cost of the system itself is further reduced.

Although the disclosure of system and method has been described in connection with the embodiment of the present invention illustrated in the accompanying drawings, it is not limited thereto. It will be apparent to those skilled in the art that various substitutions, modifications and changes may be made thereto without departing from the scope and spirit of the disclosure.

What is claimed:

1. A method comprising:
    searching for a free sector in a flash memory using a look up table (LUT) stored in a controller RAM coupled to the flash memory;
    writing look up table data read from said controller RAM into said free sector of the flash memory in order to free space in the controller RAM;
    checking if sufficient space has been freed in the controller RAM;
    if sufficient space has not been freed, writing a next look up table data read from said controller RAM into the free sector of the flash memory;
    when sufficient space has been freed, reading a page from a source sector of the flash memory and storing the read page in the freed space of the controller RAM previously occupied by the look up table data;
    reading data of said page from the controller RAM and storing the read page to a page of a destination sector of the flash memory; and
    writing the look up table data read from the free sector of the flash memory back to the controller RAM.

2. A method for use with a memory system comprising a FLASH memory and a FLASH memory controller coupled to the FLASH memory wherein the FLASH memory controller includes a look up table random access memory for storing table data, the method comprising:
    using the table data stored in the look up table random access memory of the FLASH memory controller to identify a free sector in the FLASH memory;
    storing the table data read from the look up table random access memory of the FLASH memory controller in the free sector of the FLASH memory so as to free space in the look up table random access memory of the FLASH memory controller;
    moving data stored in a source sector of the FLASH memory to a destination sector of the FLASH memory by:
        transferring data stored in the source sector of the FLASH memory to the free space in the look up table random access memory of the FLASH memory controller; and
        transferring the data stored in the free space in the look up table random access memory of the FLASH memory controller to the destination sector of the FLASH memory; and
    storing the table data read from the free sector of the FLASH memory back to the look up table random access memory of the FLASH memory controller.

3. The method of claim 2 wherein the data stored in a source sector of the FLASH memory is a page of data.

4. Apparatus, comprising:
    a FLASH memory including a free sector, a source sector and a destination sector;
    a FLASH memory controller coupled to the FLASH memory;
    wherein the FLASH memory controller includes a look up table random access memory for storing table data; and
    a processor operable to:
        use the table data stored in the look up table random access memory of the FLASH memory controller to identify the free sector;
        transfer the table data stored in the look up table random access memory of the FLASH memory controller for storage in the free sector;
        transfer data stored in the source sector of the FLASH memory to the look up table random access memory;
        transfer data stored in the look up table random access memory to the destination sector of the FLASH memory; and
        transfer the table data stored in the free sector of the FLASH memory to the look up table random access memory of the FLASH memory controller.

5. The apparatus of claim 4 wherein the data stored in a source sector of the FLASH memory is a page of data.

* * * * *